United States Patent
Bridgelall

(10) Patent No.: US 7,433,648 B2
(45) Date of Patent: Oct. 7, 2008

(54) SYSTEM AND A NODE USED IN THE SYSTEM FOR WIRELESS COMMUNICATION AND SENSORY MONITORING

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 646 days.

(21) Appl. No.: 10/750,550

(22) Filed: Dec. 31, 2003

(65) Prior Publication Data

US 2005/0143133 A1 Jun. 30, 2005

(51) Int. Cl.
*H04B 7/00* (2006.01)

(52) U.S. Cl. .............. 455/41.2; 455/412.2; 455/418; 455/419; 455/41.3; 455/422.1; 340/531; 340/506; 340/522; 340/539.1

(58) Field of Classification Search .............. 455/83, 455/88, 414.1, 418, 419, 412.2, 41.2, 41.3, 455/422.1; 340/531, 506, 522, 539.1, 507, 340/508, 505
See application file for complete search history.

(56) References Cited

U.S. PATENT DOCUMENTS

| | | | |
|---|---|---|---|
| 6,006,100 A | 12/1999 | Koenck et al. | |
| 6,208,247 B1 | 3/2001 | Agre et al. | |
| 6,985,750 B1 * | 1/2006 | Vicknair et al. | 455/519 |
| 7,119,676 B1 * | 10/2006 | Silverstrim et al. | 340/531 |
| 2004/0139477 A1 * | 7/2004 | Russell et al. | 725/126 |
| 2005/0029339 A1 * | 2/2005 | Wilensky | 235/375 |
| 2006/0116170 A1 * | 6/2006 | Brahmbhatt et al. | 455/560 |

FOREIGN PATENT DOCUMENTS

| | | |
|---|---|---|
| WO | WO 99/17477 A | 4/1999 |
| WO | WO 01/26335 A2 | 4/2001 |

* cited by examiner

*Primary Examiner*—Matthew Anderson
*Assistant Examiner*—Dominic E Rego
(74) *Attorney, Agent, or Firm*—Ingrassia Fisher & Lorenz, P.C.

(57) ABSTRACT

A system is provided for communication and sensory monitoring. The system comprises a plurality of nodes installed as a network in a structure. Each of the plurality of nodes comprises an internode transceiver for wireless communication between nodes, a wireless network transceiver for wireless communication with one or more wireless devices, one or more sensors for monitoring the environment of the structure and a processor coupled to the internode transceiver, the wireless network transceiver and the one or more sensors to exchange data with the internode transceiver, the wireless network transceiver and the one or more sensors devices coupled to the processor and process the data. The system also includes a wide area network bridge coupled to the plurality of network nodes. The network bridge receives data from the plurality of network nodes and passes the information to a computer network for processing.

47 Claims, 6 Drawing Sheets

US 7,433,648 B2

SYSTEM AND A NODE USED IN THE SYSTEM FOR WIRELESS COMMUNICATION AND SENSORY MONITORING

TECHNICAL FIELD

This invention relates to the field of networked sensors and, more specifically to a system and a node used in the system for wireless communication and sensory monitoring.

BACKGROUND

In the increasingly competitive business environment, companies are constantly looking for ways to cut the cost of operation in order to increase profit and/or pass savings on to the retail consumers so as to encourage increased purchases and revenue growth. One way is to use one of the many systems that have been proposed to track inventory, such as tracking inventory with handheld bar code scanners or radio-frequency identification scanners. These systems allow for tracking of assets in a supply chain.

A drawback of current systems is that they typically are labor intensive, requiring individual workers to track inventory using handheld devices. Additionally, current tracking systems only track assets, they do not have the ability to sense the environment of the system and trigger responses based on the environment.

Additionally, current systems typically utilize nodes such as wireless access points that are only able to receive data logged by other devices and pass that data to a remote computer. Current nodes cannot gather data about an area or system. Also, current nodes do not have processing abilities at the node level. Therefore, there is a need for a reconfigurable communication and sensor network.

BRIEF SUMMARY

A sensor network in accordance with an embodiment of the present invention includes a plurality of individual nodes distributed in an area. Each node is able to communicate with each other in an ad-hoc manner. Each node also can send and receive information from wireless devices as part of a wireless local area network. The nodes can include one or more sensors for detecting the condition of the environment in which the nodes are deployed. The nodes are able to process data at the node level and initiate corrective and informative action based on received data.

In one embodiment of the present invention, a system is provided for communication and sensory monitoring. The system comprises a plurality of nodes configured as a network. Each of the plurality of nodes comprises an internode transceiver for wireless communication between nodes, a wireless network transceiver for wireless communication with one or more wireless devices, one or more sensors for monitoring the environment and a processor coupled to the internode transceiver, the wireless network transceiver and the one or more sensors to exchange data with the internode transceiver. The wireless network transceiver and the one or more sensor devices coupled to the processor and process the data. The system also includes a wide area network bridge coupled to the plurality of network nodes. The network bridge receives data from the plurality of network nodes and passes the information to a computer network for processing.

In one embodiment the node further comprises an RFID transmitter and receiver for interrogating RFID tags.

BRIEF DESCRIPTION OF THE DRAWINGS

The present invention will hereinafter be described in conjunction with the following drawing figures, wherein like numerals denote like elements.

DETAILED DESCRIPTION

The instant disclosure is provided to further explain in an enabling fashion methodologies and techniques for making and using various embodiments in accordance with the present invention as well as the best modes of practicing the invention as contemplated by the inventor. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, in the interest of brevity and minimization of any risk of obscuring the principles and concepts according to the present invention, further discussion of such software, if any, will be limited to higher level principles and concepts as employed or applied to or by the preferred embodiments.

Figure 1:
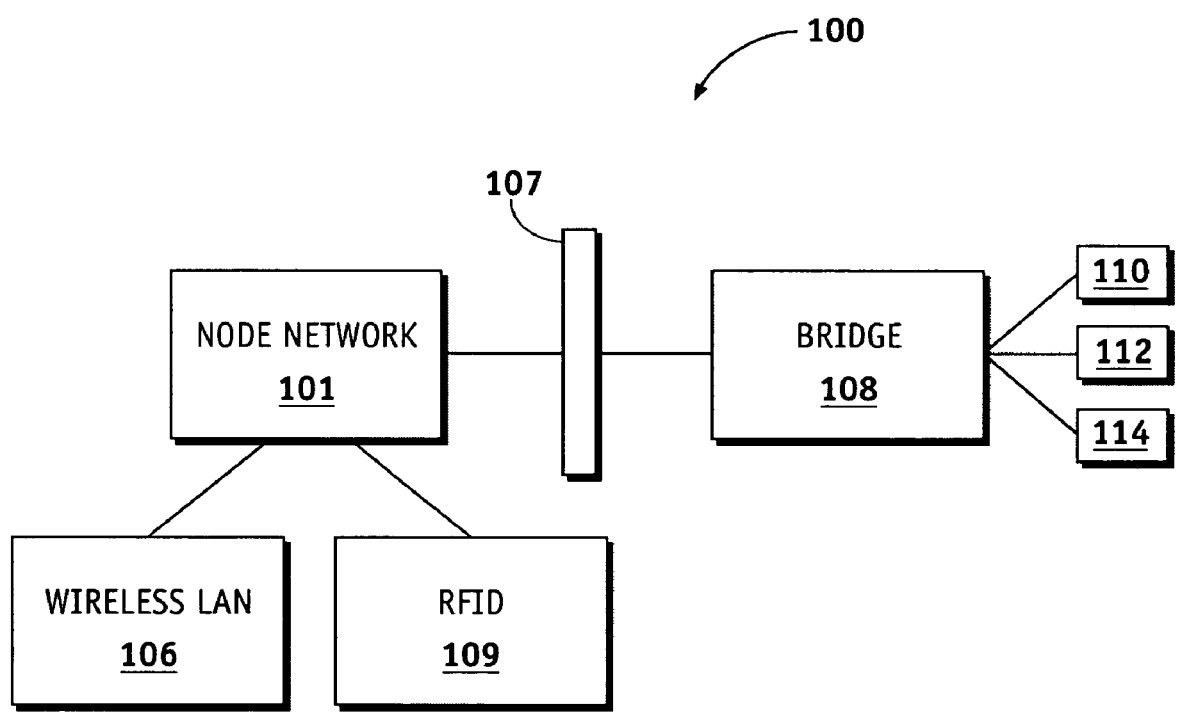
FIG. 1 is a block diagram of a system employing an embodiment in accordance with the present invention.
Figure 2:
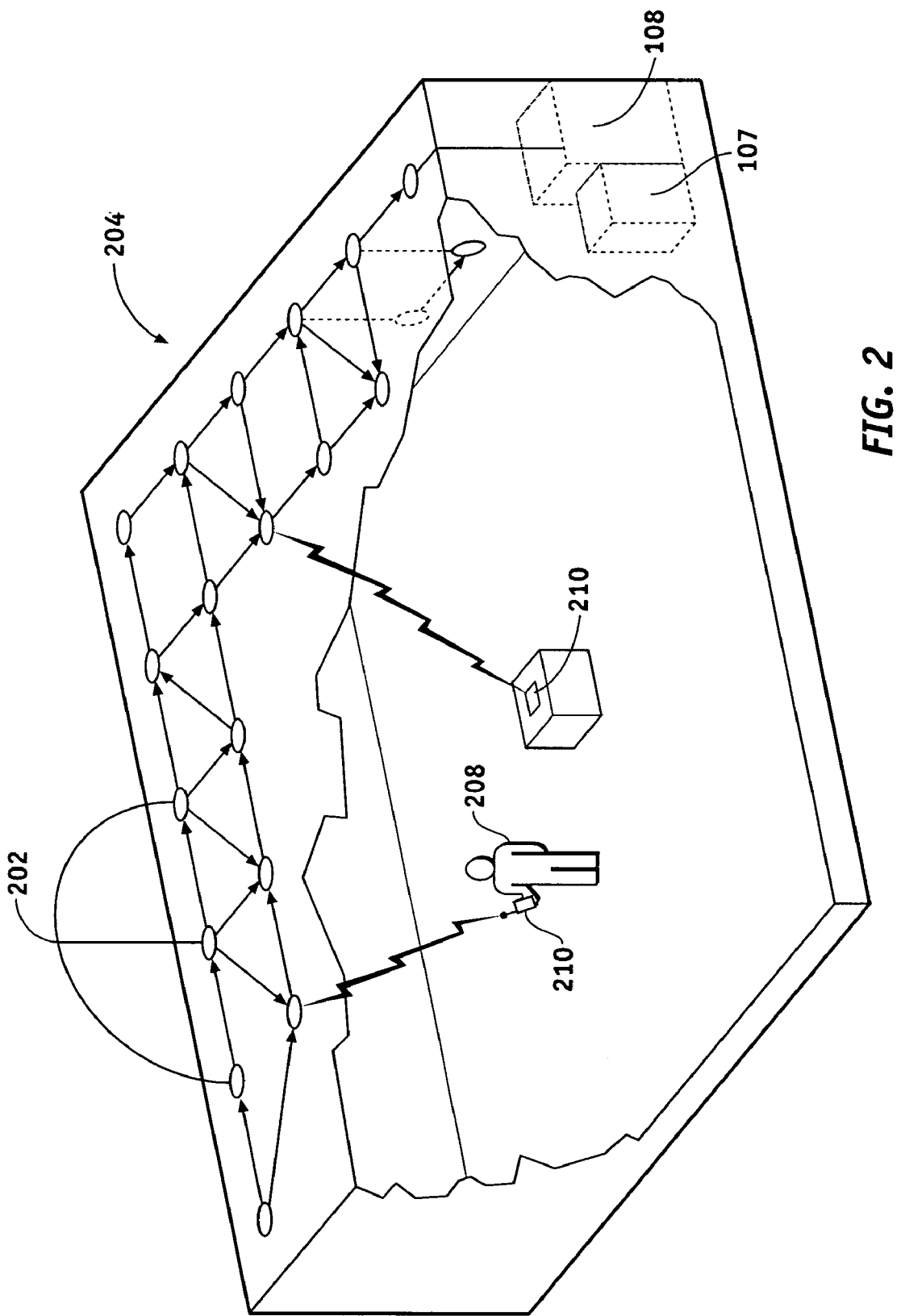
FIG. 2 illustrates an embodiment in accordance with the present invention deployed in a structure.
Figure 3:
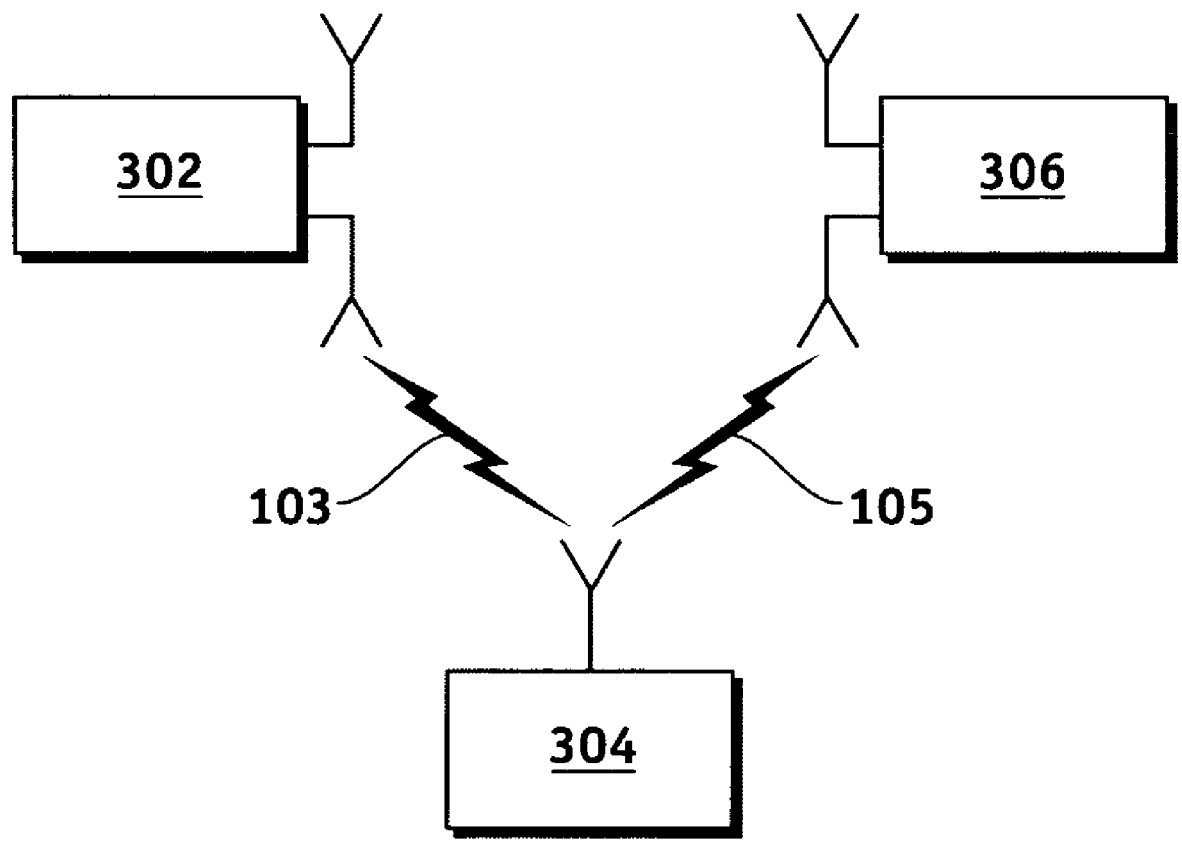
FIG. 3 illustrates an embodiment of node to node communication using a mobile unit.

A system 100 in accordance with an embodiment of the present invention including an embodiment of sensor network 101 is illustrated in FIGS. 1-3. System 100 includes the sensor network 101, which comprises a plurality of nodes 202 distributed throughout a structure 204 such as a warehouse or manufacturing plant. Node 202, in one embodiment, collects data from one or more sensors, from other nodes 202, from wireless devices 208 and other computers or similar devices. An exemplary structure of node 202 is discussed in conjunction with FIGS. 4-6. Network 101, through the individual nodes 202 can communicate with and transfer data between a wireless local area network (WLAN) 106 via wireless connection 105. In this manner, each node 202 of the network 101 and any device communicating with the nodes, even if only temporarily communicating with the node are part of the WLAN 106. Sensor network 101 through the individual nodes 202 can also interact with an RFID system 109 which can receive replies from RFID tags 210 interrogated by nodes 202.

Network 101, in addition to a plurality of nodes 202, also includes a central controller 107 and wide area network bridge 108. Central controller 107 acts as a data consolidation point that provides network management and interface functions similar to those accomplished by centralized access port switches.

Bridge 108 provides an interface for the network 101 to a wired or wireless wide area network where the information gathered by the nodes can be analyzed, processed, stored or otherwise utilized. For example, the nodes 202 of sensor network 101, through bridge 108 can access (and be accessed from) external LANs 110, the Internet 112 or any other network 116. Bridge 108 can additionally execute computer programs that can monitor the sensor data from the node 303 and then trigger an activity as a result of the sensor data. Computer programs can also be executed by central controller 107. Bridge 108 and central controller 107 can be an integrated unit, or the functionality of central controller 107 and bridge 108 may be distributed among two or more computers.

Network 101, through nodes 202, receives process and transfers data concerning the environment in which it is installed. In an exemplary embodiment, network 101 includes a plurality of nodes 202 distributed throughout a structure 204 such as a factory or warehouse. The nodes 202 can be located on the ceiling of the structure, on the walls, on the floor, a mixture of those locations or any other locations where a network node is desired. While FIG. 1 shows the nodes 202 in a building, the network 101 may be deployed in any area, such as a building or even an outdoor location.

In one embodiment, each node 202 covers a certain fixed area for wireless local network communication, sensor coverage or other capabilities. The coverage area for each node 202 can be exclusive for a particular node 202 or the coverage area of the nodes 202 can overlap. The distribution of nodes 202 is done in such a way as to minimize areas of no or poor coverage in the area where the nodes 202 are deployed. The actual distribution of the nodes 202 of a network 101 depends on factors such as the structure 204 in which the nodes 202 are deployed, the power output of each node 202, and the like.

Each node 202 can communicate with other nodes 202 in the network 101 and with wireless devices such as wireless personal digital assistants (PDAs), laptop computers, server computers and any other electronic device that can communicate wirelessly. As illustrated in FIG. 2, operator 208 of a wireless device 210, such as a wireless mobile unit, communicates with nodes 202. In one embodiment, the wireless device 210 and the nodes 202 are 802.11 compliant, although other frequencies and wireless transmission protocols can be used. Wireless devices 210, in one embodiment, can collect data and send it to nodes 202 for transfer through the network 101 to a remote computer coupled to network 101 via bridge 108. Additionally, the user 208 of the wireless device 210 can communicate with a computer coupled to the network 101 in order to query a database, request files or programs, initiate a remote program and the like. In this manner, node 202 behaves like a wireless access point.

A node in accordance with the teachings of the present invention can, however, provide more functionality than is provided by a standard wireless access port. Nodes 202, as will be discussed in more detail in conjunction with FIGS. 4-6, have local processing ability and can manipulate data locally. For example, nodes 202 can filter received data. Also, data sent to one of the nodes 202 can initiate a program to be run on the individual node. For example, the wireless device could be part of an inventory control system that collects data concerning the number of pallets in an area using a bar code reader or a radio frequency identification device (RFID) reader. When one or more nodes 202 receive the data concerning the number of pallets, that information could trigger, at the node level, a camera provided as part of the node 202 to turn on and observe the pallets. The video captured can be sent to another party for verification or the node 202 itself could use optical recognition software to verify the count of the pallets. Therefore, the nodes 202 of the present invention allow for data collection and data processing at the individual node level.

In addition to communicating with wireless devices, each node 202 communicates with other nodes 202. In one embodiment, nodes 202 communicate using a high bandwidth microwave link operating at or near 60 MHz. Other frequencies, such as those in the Industrial Scientific and Medical (ISM) band can be used. Nodes 202 have the ability to "beam steer"; i.e., direct, the output of node 202 to a specific other node in the network 101 by using phased array antennas or other antenna systems. Through the use of beam steering, each node 202 can send transmissions (transmit information) to any other node 202 in the network 101. Other methods of directing transmissions including beam switching can also be used.

Information is preferably transmitted between nodes 202 in the network using an ad-hoc routing scheme. That is, the path that data takes through the network is not determined before hand but determined by each node 202 as the node receives the data. In accordance with an embodiment of the present invention, each node 202 is able to calculate its latency and share that information with other nodes 20 to determine the path the data should take. The information regarding the path the data can take can be stored at each node 202 as one or more routes in a routing table. The determination of ad-hoc routes and the formation of routing tables are well known in the art.

Wireless device 208 can also be used to transmit data from one node to another without the necessity for the information to travel between nodes. In this manner, as seen in FIG. 3, information is transmitted from a first node 302 to a wireless mobile unit 304 (such as wireless device 208), which then relays it to a second node 306. Essentially, in this embodiment, the mobile unit 304 behaves like a bridge connecting wireless nodes. Any information collected or generated by mobile unit 304 can be sent to any node. First node 302 can query second node 304 for information, including sensor information, via mobile unit 304.

An advantage of network 101 is that it is scalable; additional nodes can be added or existing nodes removed from the network 101. When adding nodes to an existing network, the new node, upon activation, communicates with existing nodes for the purpose of locating itself in the network and for the determination of ad-hoc routing. In one embodiment, a new node can locate itself relative to other nodes using a well known triangulation method. For example, the nodes can have an RFID transceiver (or emulate an RFID tag) and a node can determine its location by interrogating other node and using well-known location techniques. Alternatively, the node 202 can have its location in a network manually entered into the node 202. Additionally, the node 202 can access locational information broadcasted by GPS satellites to determine location of the node 202.

In accordance with an embodiment of the present invention, network 101 is also self-healing. Loss of a node in the network is not fatal to the network. Instead, when one of the nodes 202 of the network 101 fails, the other nodes 202 eliminate that node from use in a route through the network and continue operation.

In accordance with an embodiment of the present invention, the nodes 202 of network 101, in additional to communicating with wireless devices 210 and other nodes 202, also have the ability to interrogate radio frequency identification (RFID) tags 210. In a particular embodiment of the present invention, the nodes 202 of the network 101 may interrogate individual RFID tags 210 as part of an asset tracking system. Additionally, the nodes 202 of the network 101 can interrogate RFID tags 210 that enter areas covered by certain nodes 202 to check for the presence of unauthorized personnel or equipment. These are just a few exemplary uses for an RFID reader integrated with a node.

While network 101 is illustrated as having nodes that can communicate with wireless devices, any computer, laptop or server may permanently or temporarily join the network 101 over the wireless local area network. This can be done to provide additional data collectors to send information through the network, to provide additional processing power to process data, to provide additional or different sensor functions to determine the environment of the network and the like. The other computers can join the network in an automatic, ad-hoc manner.

In the present invention the nodes 202 may include one or more sensors to detect the state of the environment around the node. The data collected by the sensor can be passed through the network 101 and processed external to the nodes 202 of network 101. In some circumstances the data collected by the nodes 202 can be processed at the node 202 and actions can be taken at the node 202 based on the data. Not all nodes 202 will necessarily have the same functionality as other nodes. For example, nodes 202 may have different sensors depending on their location in the network or other factors. Also, nodes 202 may differ in the data that can be stored or processing ability.

In one embodiment, one of the nodes 202 may need to know information that can be determined only from a sensor that it does not have, such as a temperature sensor. The node without the temperature sensor can cause a node with the temperature sensor to collect and send the temperature information. In effect nodes can borrow the capability of each other or of any device that is part of the network. Nodes 202 can borrow any capability from any node or other device coupled to the network.

Sensors can also be integrated as part of the wireless devices 208 or any other computer that has joined the network 101. In this embodiment of the present invention, sensors on the wireless device 208, such as barcode scanners, can gather information and send it over the wireless network to nodes, triggering some type of response or action.

Figure 4:
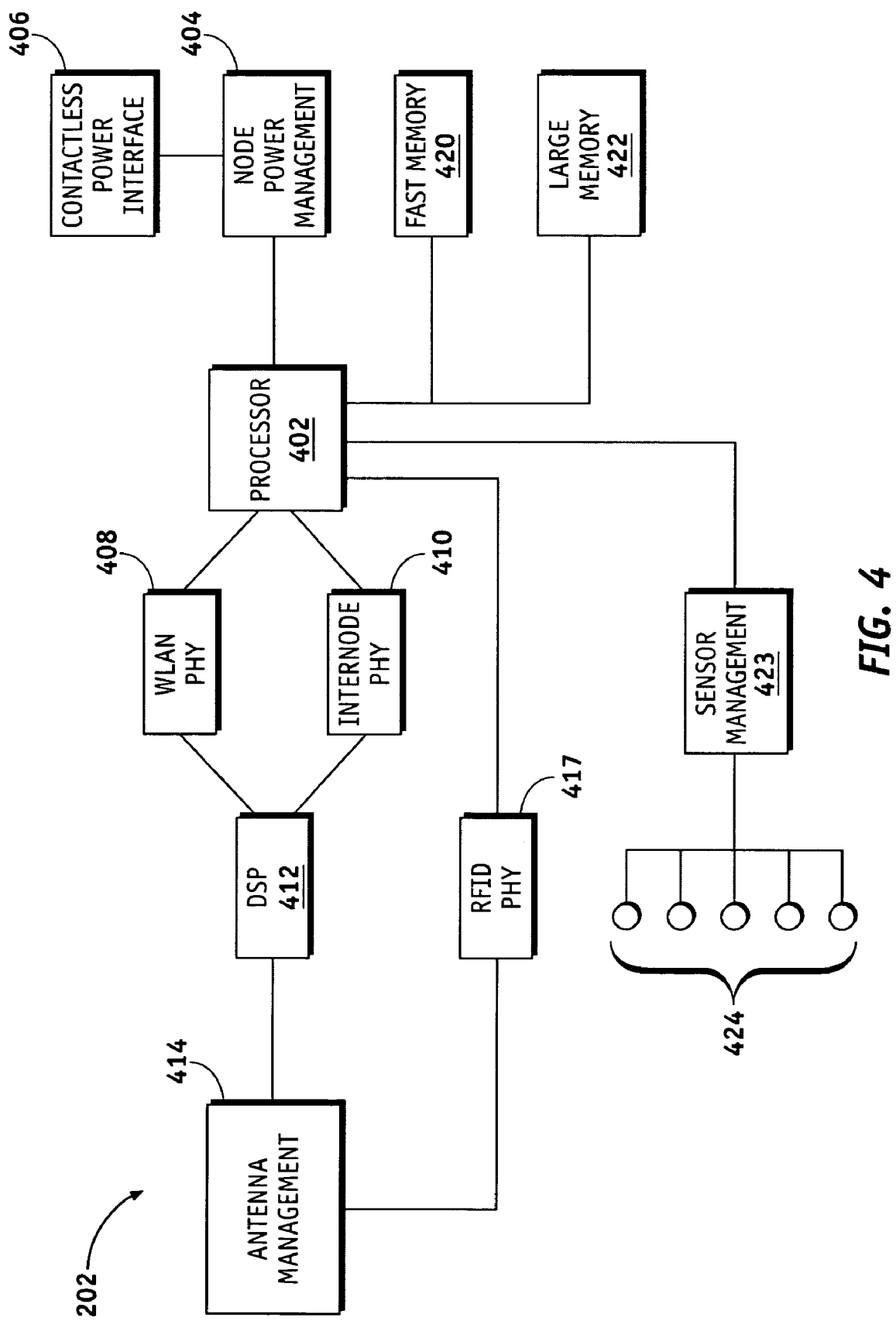
FIG. 4 is a block diagram illustrating the major components of a node.
Figure 5:
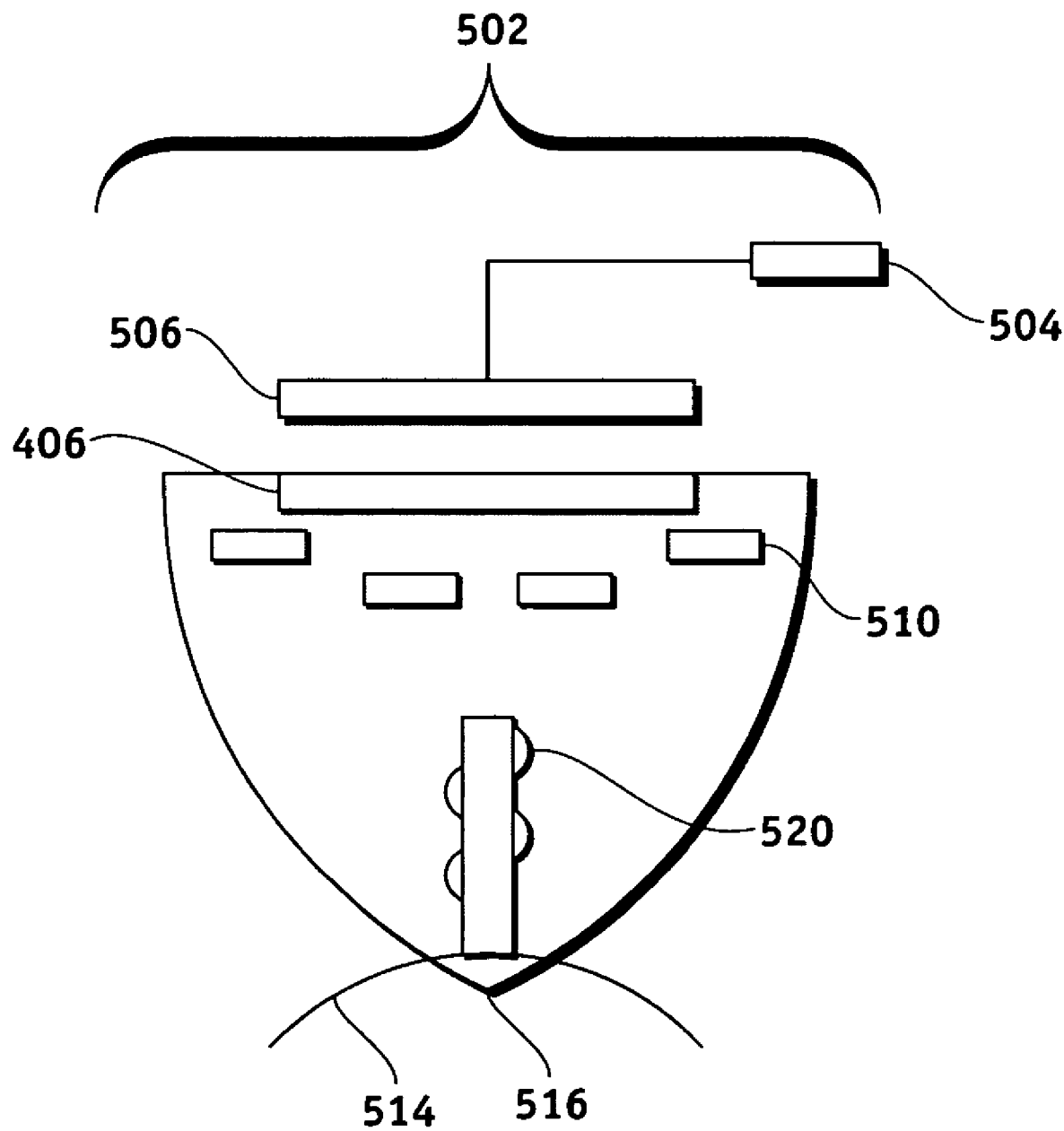
FIG. 5 illustrates the node and contactless power sources in accordance with one embodiment of the present invention.
Figure 6:
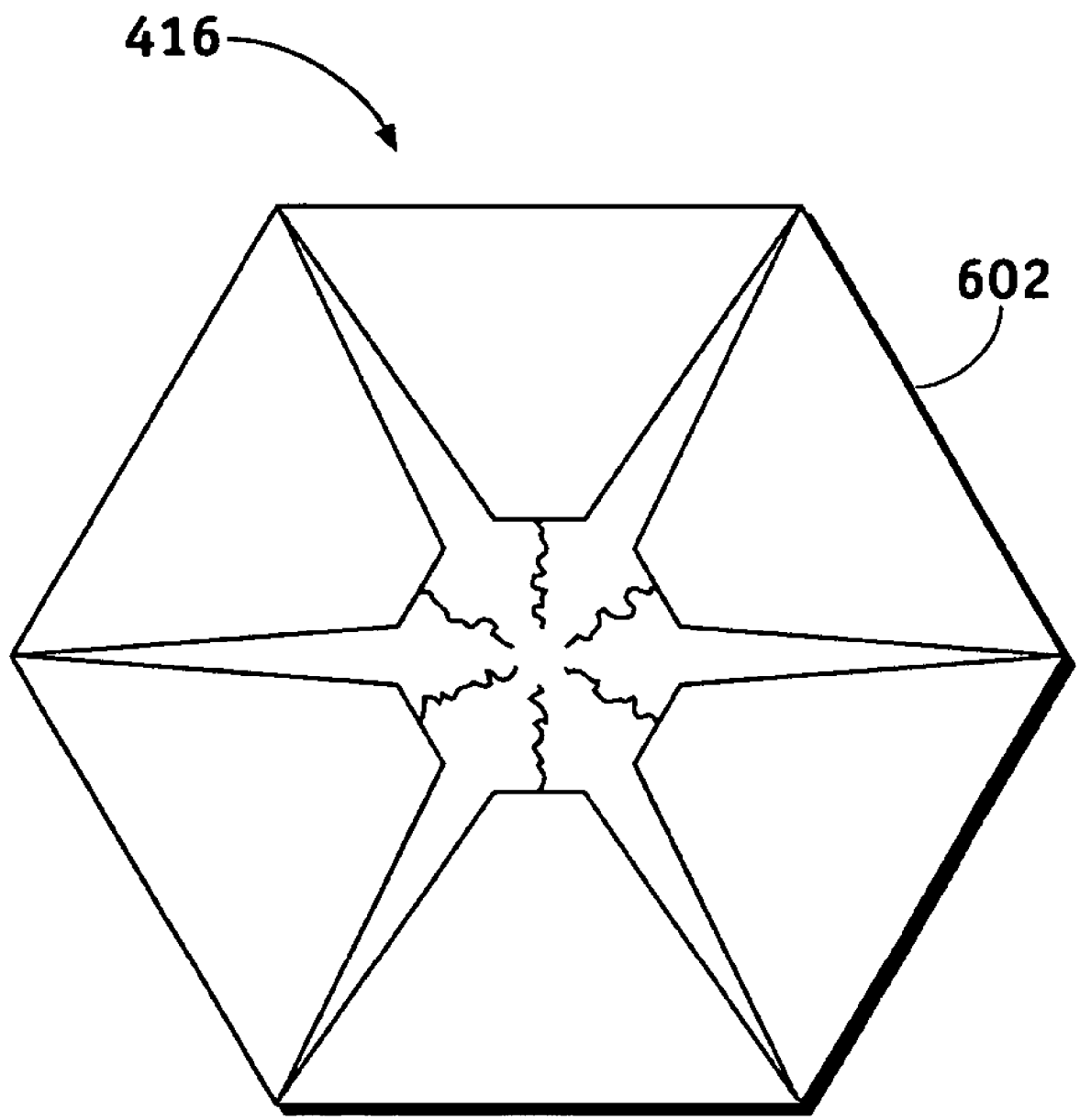
FIG. 6 illustrates an alternative embodiment of an antenna for use in an embodiment of the present invention.

An exemplary configuration of node 202 is illustrated in FIGS. 4-6. Node 202 includes a processor 402 coupled to a power manager 404, which in turn is coupled to a contactless power interface 406. To provide for communication between nodes and between nodes and wireless devices, node 202 includes a wireless local area network (WLAN) physical layer (WLAN PHY) 408 and an internode wireless physical layer (Internode PHY) 410 coupled between the processor 402 and a digital signal processor (DSP) 412. To provide RFID interrogations and replies, a radio frequency identification physical layer (RFID PHY) 417 is provided. Both the RFID PHY 417 and the DSP 412 are connected to an antenna manager 414, which in turn couples antennas 416. Memory in the form of a fast access memory 420 and large memory 422 can be included. A sensor interface management device 423 couples between processor 402 and one or more sensors 424.

Processor 402 is, in one embodiment, any commonly available microprocessor such as an embedded processor made by Hitachi, MICROCHIP and AMD. Processor 402 exchanges data with the components attached to it. In addition processor 402 can also execute routines locally to implement security, to allow the node to find itself in a network, to determine its own latency and the latency of other nodes in order to implement ad hoc routing of packets of data and to initiate a response based on data received by a sensor or other input to the node 202. Processor 402 can store and retrieve data from fast memory 420 and large storage memory 422. Processor 402 can also execute programs retrieved from memory. In a typical embodiment of the present invention, much of the functionality of the node is based on routines and programs run on a processor, such as processor 402 and other processors. The writing and execution of such programs is well known in the art.

Memory in node 202 includes fast memory 420 and/or a large storage memory 422. Fast memory 420 acts like cache memory and typically stores data that is needed by the processor often or data that is time sensitive. Data such as routing table information may be stored in fast memory. Fast memory 420 typically is implemented as solid state memory although any memory device that provides fast access times and can be used as cache memory can be used. Large storage memory 422 stores data received from other nodes, data generated by that node, or data and programs needed by the processor 402. Information may include data such as a log of activity of that node, the results of self-test diagnostics and routing information for the network 101. Large storage memory 422 is designed to hold large amounts of data and can be a hard drive, a rewritable optical drive, a high capacity flash memory or any other memory device capable of storing a large amount of data.

The processor 402 and other components of node 202 require a source of power to operate. In the embodiment illustrated in FIG. 4, each node 202 includes a node power manager 404, which regulates the delivery of power to the components of node 202. The power can be provided using well-known contactless power arrangements such as capacitive or inductive coupling.

In one embodiment of a contactless power transfer scheme, power is transferred via magnetic coupling. This can be achieved by using a split transformer. One half, the half-connected to a power supply, contains the primary coil and part of the magnetic core. The other half of the transformer contains the secondary coil and the other part of the magnetic core. The primary coil receives power from the first half and converts it into a high-frequency power output. Power induced into the secondary coil is rectified and converted into the appropriate form for the node's use. Other known contactless power supply methods can also be used.

In FIG. 5, node 202 and contactless power supply 502 are illustrated. Contactless power supply 502 comprises a source of electricity 504, such as an electrical plug attachable to a standard outlet or an electrical tap off an existing electrical device such as a light fixture, and a contactless power interface 506. The electrical power is received from the power interface 506 to the contactless node interface 406 in node 202. The transfer of energy can directly power the node 202 or the energy can be stored in an energy storage device such as a capacitor or rechargeable battery used by the node 202 when needed.

Power can also be provided to node 202 in other ways. Battery power can be used to power the nodes 202; however, there are drawbacks to the use of batteries, mainly the need to replace the batteries when they are drained. Nodes 202 can also be wired to a power source such as a 110 or 220 volt power supply. This approach however, makes installation more difficult because power cables have to be routed to each of the nodes 202.

In order to implement wireless LAN communication between node 202 and wireless devices 210, node 202 includes wireless LAN physical layer device 408. Wireless LAN PHY device 408 defines such parameters as the transmission scheme and data rate for transmitting data in a WLAN. Node 202 is designed to use standard wireless LAN transmission protocols such as those defined in IEEE 802.11a-802.11g. However, node 202 need not be tied to any transmission protocol and can be designed to communicate using any protocol used by the WLAN.

The implementation of data transfer between nodes is implemented by the internode wireless physical layer (internode PHY) device 410. As discussed previously, transmission between nodes is done, in one embodiment, using a 60 MHz signal that is beam steered for directional transmission to specific nodes 202. However, any usable frequency spectrum can be used as well as any other method of directing communication.

WLAN PHY device 408 and internode PHY device 410 are coupled to antenna manager 414. Antenna manager 414 prepares the data for presentation to the antenna 416. Antenna 416 can be an antenna shared by the various transceivers or a separate antenna can be provided for internode communication, wireless LAN communication and RFID signaling. Exemplary antenna manger 414 also controls the antenna 416 itself. In one embodiment, WLAN and internode transmissions are done using a phased array antenna. In a phased array antenna, individual phased array elements 510 are used to form the array antenna and each individual element transmits the same signal but with a different phase shift. The phase shifts are arranged such that the different signals interface constructively in just one direction and destructively in all other directions. By carefully selecting the phase shift, the direction of the transmitted signal can be "steered" in a certain direction (such as towards a particular node). Antenna manager 414 determines the necessary phase shifts for transmission. The WLAN PHY device 408 and antenna manager 414 together form a WLAN transceiver and the internode PHY 410 and antenna manager 414 form an internode transceiver.

In another embodiment of the present invention, as seen in FIG. 6, antenna 416 can comprise multiple microwave horn antennas 602. In this embodiment, the microwave horn antennas can be arranged in a hexagon pattern. Each horn in the hexagon can be attached to an individual feed from the internode PHY 410. Then, the horn antenna 602 that is to broadcast is switch to the internode PHY 410 and the transmission occurs in the direction the horn antenna is pointing. This is known as beam switching and can be used to direct node to node communications. Alternatively, multiple adjacent antennas can be fed the same signal from the internode PHY 410 and the information is transmitted in a beam steering fashion.

The above antennas are exemplary antennas only. Any other antennas can be used using any transmission scheme. While beam steering and beam switching can be used, other methods of directing transmissions can be used in place of or in conjunction with beam steering and beam switching including well known schemes such as polarization steering.

To increase the information transfer rate, the antennas 416, such as a phased array antenna, can use techniques to increase information transfer rates such as the well known multiple-input multiple output (MIMO) technique. In accordance with an embodiment of the present invention, DSP 412 is a MIMO DSP and the MIMO technique can be implemented using such a MIMO digital signal processor (DSP) 412. A MIMO phased array antenna sends a different signal over each path between the transmitting and receiving arrays. MIMO exploits multi-path scatterings to increase the capacity of a transmission system. If MIMO is used, then the MIMO Digital Signal Processor (DSP) 412 is used to convert the data from either the WLAN PHY device 408 or the internode PHY device 410 to the proper format for MIMO transmission. If other transmission schemes are required, DSP 412 can implement the transmission scheme.

In accordance with one embodiment of the invention RFID physical layer (RFID PHY) 417 device provides the physical layer implementation for RFID reader and backscatter emulation. This allows node 202 to interrogate RFID tags 210 in order to locate items in a structure. Additionally, nodes 202 can respond to interrogating by simulating a backscattering RFID tag.

In one embodiment, node 202 utilizes a swept polarization omni-directional combination (SPOCK) antenna 520 to send and receive RFID interrogations and replies. A SPOCK antenna allows for greater RF signal penetration. While SPOCK antennas can be used, any conventional antenna adaptable for use with RF transmissions can be used.

Each node 202 can have one or more sensors 424. Sensors 424 can be any device capable of collecting data about the environment in and around the node 202. Sensors 424 include audio sensors, visual sensors, thermal sensors, humidity sensors, smoke sensors, radiation sensors and the like. Preferably most or all of these sensors can be implemented using microelectromechanical systems (MEMS) techniques. The use of MEMS sensors could significantly reduce the size of each node 202. However, conventional sensor design can also be used. Sensors 424 can be contained in sensor housing 516 as shown in FIG. 5.

A sensor interface and management device 423 couples between the processor 402 and one or more sensors 424. Sensor interface and management device 423 transfers data between the one or more sensors 424 and the processor 402. Additionally, the sensor interface management device 423 controls mix and match node 202 configurations such that some nodes have certain features and others have other features. Sensor interface and management device 423 also provides data multiplexing, data prefiltering and feature extraction for further processing.

Node 202, as illustrated in FIG. 5, may also include an audio spot light lens 514, which sends and receives audio signals in a small confined area. Lens 514 is, in one embodiment, a parabolic or similar antenna. Audio spot light lenses are known in the art. Also, a sensor housing 516 can be mounted on the node 202. Sensor housing 516 can house the sensors.

In those embodiments in which an audio sensor is implemented in a node, such an audio sensor can take many forms. In one embodiment, the audio sensor of one or more nodes 202 could be configured to listen for certain sounds and send a signal when an external sound matched a sound it was looking for. For example, the sensors could be listening for the sound of a forklift. When the sensor detects the sound of a forklift, a signal can be generated that may activate the node to interrogate the RFID tag of the fork lift to insure it was authorized to be in the area where the node was located.

In another embodiment, the audio sensor can actually be a transmitter. Using a highly focused, directional antenna such as the audio "spotlight" antenna 514, as illustrated in FIG. 5, information can be broadcast to a small area by one or more nodes 202. This allows for messages to be directed to only individuals within the footprint of the antenna emission of a particular node or nodes antenna emission. Information such as warning messages or area specific targeted advertising can be broadcasted.

Further, the audio spotlight, when used as part of a multi-node system could be used by individuals as a virtual speakerphone. A transmitting individual within the spotlight antenna footprint of one or more nodes 202 can speak and the sound picked up by a transceiver in the one or more nodes 202. That audio signal is then digitized and routed to another node where the receiving individual is within that nodes antenna footprint. The receiving individual will then hear what the transmitting individual said. The receiving individual can then speak with the system then working in reverse. Such a system could support full duplex audio communication. The location of each individual could be determined and tracked using RFID transmissions and well-known triangulation methods and/or utilizing a phase difference of arrival technique. Also, in accordance with a further embodiment of the present invention, the conversation of one individual can be routed over a network using voice over IP techniques. Such conversation can be routed to the public switched telephone network and on to any landline or cellular phone or device.

Visual sensors in one embodiment can utilize either a video camera or still camera. The visual sensor is can be used to produce a video record of events in an area. In accordance with an embodiment of the present invention, the visual sensor can be triggered by unusual events such as sounds detected by an audio sensor, removal of tagged merchandise in an excessive number, constant read errors by an RFID interrogator, the use of an unauthorized wireless device and the like. Once triggered, a video record can be made of the unusual events. Using known tracking techniques, such as detecting the non-modulated cancellation vectors in back-scattered RFID transmissions, or using the Doppler effect on RFID transmissions, a video or still image record could be made of the triggering events such as an individual as he or she moved about the structure.

Visual sensors may also be used to observe shelf tags, or pallets or the like if needed by a user. Such a system, for example, could verify the number of units on a shelf and/or send an alert to replenish supplies when the number of units is significantly reduced.

Temperature sensors can be used in a variety of ways. In one embodiment, temperature sensors could sense and log the temperature in an area where perishable goods are stored. If the temperature in that area rises above a certain level, the system could then trigger a corrective response such as having the goods moved to fix the problem. Temperature sensors could also monitor the temperature of operating equipment and detect if the temperature exceeded safe temperatures.

Humidity sensors can be used to sense the relative humidity in an area and trigger a response if it exceeded a certain set value. Many plant and food items are sensitive to changes in humidity and, therefore, could benefit from this type of monitoring. Also, fine art and other antiquities need to be stored in a low humidity environment. The present invention could be used to monitor an art storage warehouse.

Smoke sensors can be used to detect smoke caused by a fire. By knowing which node or nodes detected the smoke first, the area where the fire started can be determined. This determination can be done at the node level based on responses programmed into the nodes 202 or a signal representing the detection of a fire can be sent to one external computer for analysis. Detection of smoke by a smoke sensor of one of the nodes 202 could trigger visual sensors that might record the person or thing responsible for the fire. Alternatively, visual sensors can determine the severity of the fire.

Smoke detectors can also include gas detection capabilities. In accordance with this embodiment, the air in the structure 204 can be monitored for hazardous gases such as carbon dioxide. When the amount of gas exceeds a given limit corrective action can be taken. A computer located outside network 101 can initiate this action or the action can be initiated at the node level.

A radiation sensor could determine if the amount of background radiation has increased or is at a dangerous level. The radiation might be due to many factors such as the poor handling of a manufacturing by-product or a leak of radioactive material. Also, nodes 202 may use the radiation sensor to detect radioactive sources brought in to a facility either by accident or on purpose. Thus the system can provide a security function.

The types of sensors and their uses as discussed above are only exemplary and other sensors can be mounted in the node. Additionally, the sensors discussed can also be used for other purposes.

In the examples above, network 101 was discussed in the context of use in a factory or warehouse. These are for exemplary purposes only as network 101 can be used in many different embodiments. For example, network 101 can be placed in a building as a security system. Security personnel could be tracked by RFID tags in their security badge or clothes. The security personnel could communicate with the security systems, such as receiving security alert information, using WLAN devices. Visual sensors could be used for facial recognition for comparison against a known list of people considered a security risk. The network 101 can be tied into a larger network that can contact the police. The system of the present invention is, therefore, adaptable to many different uses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for wireless communication and sensory monitoring comprising:
   a plurality of nodes installed as a network, each of the plurality of nodes comprising:
   an internode physical layer that is configured to manage wireless radio frequency communication between the node and other nodes;
   a wireless network physical layer separate from the internode physical layer that is configured to manage wireless radio frequency communication with one or more wireless devices other than the plurality of nodes;
   a common antenna coupled to both the internode physical layer and the wireless network physical layer via antenna management logic, wherein the antenna management logic is configured to direct the common antenna to transmit an internode radio frequency signal only in the direction of another of the plurality of nodes and to direct the common antenna to broadcast a wireless network signal to the one or more wireless devices;

one or more sensors for monitoring an environment of a structure; and a processor coupled to the internode physical layer, the wireless network physical layer and the one or more sensors, the processor operable to exchange data with at least one of the other nodes via the internode physical layer, to exchange data with the one or more wireless devices via the wireless network physical layer, and to obtain and process data obtained from the one or more sensors coupled to the processor; and a wide area network bridge coupled to the plurality of nodes, the network bridge configured to receive data from the plurality of nodes and pass information to a computer network for processing.

2. The system of claim 1 wherein the antenna management logic is configured to communicate using a beam steered transmission from the common antenna.

3. The system of claim 2 wherein the common antenna is a phased array antenna configured to form the beam steered transmission.

4. The system of claim 1 wherein the antenna management logic is configured to communicate using a beam switched transmission from the common antenna.

5. The system of claim 4 wherein the common antenna comprises multiple microwave horn antennas configured to form the beam switched transmission.

6. The system of claim 1 wherein the internode physical layer is configured to transmit in the industrial, scientific and medical band.

7. The system of claim 1 wherein the internode physical layer is configured to transmit at 60 GHz.

8. The system of claim 1 wherein the wireless network physical layer is 802.11 compliant.

9. The system of claim 1 wherein the one or more sensor includes an audio transducer.

10. The system of claim 9 wherein the audio transducer is coupled to a spotlight antenna for broadcasting audible transmission in a narrow footprint.

11. The system of claim 10 further comprising a first grouping of one or more nodes of the plurality of nodes and a second grouping of one or more nodes of the plurality of nodes, the first grouping configured to provide for the reception and transmission of audible communication and the second grouping configured to provide for the reception and transmission of audible communication, the first grouping of one or more nodes and the second grouping of one or more nodes together forming a virtual private speaker phone.

12. The system of claim 10 wherein different audible transmissions are broadcasted based on the location of the node.

13. The system of claim 1 wherein the internode physical layer is configured to transfer information between each of the nodes in an ad-hoc fashion.

14. The system of claim 13 wherein the processor of each node of the network of nodes is configured to determine the ad-hoc transfer path based on the latency of the node and the latency of other nodes.

15. The system of claim 1 wherein the one or more sensors include a visual sensor configured to provide a visual record of an event in response to the receipt of a signal from at least one of the one or more plurality of nodes upon detection of the event by at least one of the sensor of the one or more sensors.

16. The system of claim 1 further comprising an RFID physical layer for directing the interrogation of RFID tags.

17. The system of claim 16 wherein the RFID transceiver is coupled to the common antenna, and wherein the common antenna is a SPOCK antenna to transmit and receive RF signals.

18. The system of claim 1 wherein the wide area network bridge is coupled to connect the network to the Internet.

19. The system of claim 1 further comprising one or more wireless devices configured to join the network of nodes to provide additional functionality.

20. The system of claim 19 wherein the wireless device is configured to route transmissions from one node of the network of nodes to another node of the network of nodes.

21. The system of claim 1 where a first node of the network of nodes is configured to utilize sensors on a second node of the network of nodes that is not available on the first node.

22. The system of claim 1 further comprising a computer having a wireless transmitter, the computer configured to integrate into the network of nodes.

23. The system of claim 1 further comprising a contactless power system operable to provide power to the nodes with out the use of a wired connection.

24. A node for use in a communication and sensor network comprising:

an internode physical layer that is configured to manage wireless radio frequency communication between the node and other nodes;

a wireless network physical layer separate from the internode physical layer that is configured to manage wireless radio frequency communication with one or more wireless devices that are not other nodes;

a common antenna coupled to both the internode physical layer and the wireless network physical layer via antenna management logic, wherein the antenna management logic is configured to direct the common antenna to transmit an internode radio frequency signal only in the direction of another node and to direct the common antenna to broadcast a wireless network signal to the one or more wireless devices;

one or more sensors for monitoring an environment of a structure; and a processor coupled to the internode physical layer, the wireless network physical layer and the one or more sensors, the processor operable to exchange data with at least one of the other nodes via the internode physical layer, to exchange data with the one or more wireless devices via the wireless network physical layer, and to obtain and process data obtained from the one or more sensors coupled to the processor.

25. The node of claim 24 wherein the antenna management logic is configured to communicate using a beam steered transmission from the directional antenna.

26. The node of claim 25 wherein the directional antenna is a phased array antenna configured to form the beam steered transmission.

27. The node of claim 26 wherein the internode physical layer is configured to transmit in the industrial, scientific and medical band.

28. The node of claim 26 wherein the internode physical layer is configured to transmit at 60 GHz.

29. The node of claim 26 wherein the one or more sensors include a visual sensor for providing a visual record of an event, the visual sensor initiated by at least one of the one or more plurality of nodes detecting the event using another sensor of the one or more sensors.

30. The node of claim 25 wherein the directional antenna is a multiple horn antenna configured to form the beam steered transmission.

31. The node of claim 24 wherein the directional antenna is a multiple horn antenna configured to form a beam switched transmission.

32. The node of claim 24 wherein the wireless network physical layer comprises a transceiver that is 802.11 compliant.

33. The node of claim 24 wherein at least one of the one or more sensors includes an audio transducer.

34. The node of claim 33 wherein the audio transducer is coupled to a spotlight antenna to broadcast audible transmission in a narrow footprint.

35. The node of claim 34 wherein the node is part of a first grouping of one or more nodes and wherein there is a second grouping of one or more nodes, the first grouping configured to provide for the reception and transmission of audible communication and the second grouping configured to provide for the reception and transmission of audible communication, the first grouping of one or more nodes and the second grouping of one or more nodes together forming a virtual private speaker phone.

36. The node of claim 34 wherein different audible transmissions are broadcasted based on the location of the node.

37. The node of claim 24 wherein the node is part of a network of nodes configured to transfer information between each of the nodes in an ad-hoc fashion.

38. The node of claim 37 wherein the processor of each node of the network of nodes determines the ad-hoc transfer path based on the latency of the node and the latency of other nodes.

39. The node of claim 24 further comprising an RFID physical layer coupled to the processor and the antenna management logic, and wherein the RFID physical layer is configured to interrogate RFID tags.

40. The node of claim 39 wherein common antenna comprises a SPOCK antenna.

41. The node of claim 24 wherein the node is configured to receive power using a contactless power supply.

42. A node for use in a communication and sensor network comprising:
an internode physical layer that is configured to manage wireless radio frequency communication between the node and other nodes;
a wireless network physical layer separate from the internode physical layer that is configured to manage wireless radio frequency communication with one or more wireless devices that are not other nodes;
an RFID physical layer separate from both the internode physical layer and the wireless network physical layer that is configured to interrogate RFID tags in proximity to the node;
a common antenna coupled to the internode physical layer, the wireless network physical layer and the RFID physical layer via antenna management logic, wherein the antenna management logic is configured to direct the transmission of a directional internode radio frequency signal on the common antenna only in the direction of another node, to direct the broadcast of a wireless network signal on the common antenna, and to direct communications between the node and any RFID tags in proximity to the node using the common antenna; and
a processor coupled to the internode physical layer, the wireless network physical layer and the RFID physical layer, wherein the processor is configured to direct the internode physical layer to exchange data with at least one of the other nodes via the common antenna, to direct the wireless network physical layer to exchange data with the one or more wireless devices via the common antenna, and to direct the RFID physical layer to interrogate the RFID tags using the common antenna.

43. The node of claim 42 further comprising a digital signal processor separate from the processor coupling the internode physical layer and the wireless network physical layer to the antenna management logic.

44. The node of claim 42 further comprising a sensor coupled to the processor, and wherein the processor is further configured to collect and process data obtained from the sensor.

45. The node of claim 42 wherein the antenna management logic is configured to direct the transmission of the directional internode radio frequency signal using beam steering techniques.

46. The node of claim 42 wherein the antenna management logic is configured to direct the transmission of the directional internode radio frequency signal using beam switching techniques.

47. The node of claim 42 wherein the common antenna is a SPOCK antenna.

* * * * *